United States Patent Office

3,143,555
DIPHENYLACETAMIDE DERIVATIVES
John Krapcho, New Brunswick, N.J., assignor to Olin Mathieson Chemical Corporation, New York, N.Y., a corporation of Virginia
No Drawing. Filed Mar. 5, 1962, Ser. No. 177,207
12 Claims. (Cl. 260—347.3)

This invention relates to new diphenylacetamide derivatives. More particularly this invention relates to compounds of the general formula

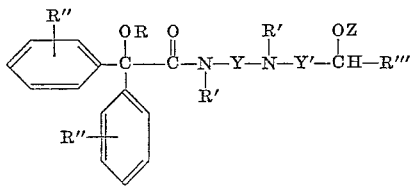

wherein R is a lower alkyl radical, preferably of less than five carbon atoms (e.g., methyl, ethyl, propyl, isopropyl, and butyl); R' is lower alkyl (e.g., methyl, ethyl, propyl, butyl and hexyl) or lower alkenyl (e.g., allyl, methallyl, 2-buentyl and 2-hexenyl); R'' is hydrogen, halogen (i.e., fluorine, chlorine, bromine or iodine), halomethyl, which may be mono-halomethyl (e.g., chloromethyl) or polyhalomethyl (e.g., trifluoromethyl), lower alkyl (e.g., methyl and ethyl), lower alkoxy (e.g., methoxy and ethyoxy), hydroxy, nitro, amino, cyano, lower alkanoyloxy (e.g. acetoxy) or phenyl; Y is a lower alkylene radical separating the nitrogens by at least two carbon atoms and includes such radicals as ethylene, propylene, butylene and hexylene, whether branched or straight chained; Y' is lower alkylene such as methylene, ethylene, propylene, butylene and hexylene, whether branched or straight chained; Z is hydrogen and acryl; R''' is an aromatic group, such as phenyl, R''-substituted phenyl, thienyl, furyl, or pyridyl; and the pharmaceutically acceptable acid-addition and quaternary salts thereof. The preferred compounds are those where R is ethyl, R'' is hydrogen, R''' is phenyl and p-NH$_2$ phenyl, Y is ethylene, Y' is methylene and Z is hydrogen.

Examples of suitable acid-addition salts of the free base compounds of this invention include the mineral acid salts, such as the hydrohalide (e.g., hydrochloride, hydrobromide and hydroiodide), the sulfate, the phosphate, and the organic acid salts, such as the citrate, tartrate, oxalate, ascorbate, methanesulfonate and succinate. (Pharmacologically acceptable acids are, of course, employed where the salt form is prepared for therapeutic use.)

Representative quaternary salts of the free base compounds of this invention may be formed by treatment of the base with such reagents as lower alkyl esters (e.g., methyl chloride, methyl bromide, ethyl bromide, dimethyl sulfate, and ethyl nitrate) and aralkyl esters (e.g., benzyl chloride) and other similar esters of inorganic acids.

The compounds of the present invention can be prepared by a variety of methods. One suitable method involves the reaction of an α-alkoxy-N-alkyl-N-(alkylaminoalkyl)-diphenylacetamide with a phenacyl halide and an alcoholic hydrogen halide and treating the resultant intermediates with a hydrogenating agent, for example, an alkali borohydride, to obtain the final product.

In an alternative procedure an α-alkoxy-N-alkyl-N-(alkylaminoalkyl)-diphenylacetamide is reacted with a styrene oxide and the resulting intermediate is treated with a hydrogen halide to obtain the final product.

The α-alkoxy-N-alkyl-N-(alkylaminoalkyl)-diphenylacetamide can be prepared by a sequence of steps in which a benzylalkylamino alkyl chloride is reacted with an alkylamine; the resulting N-benzyl-N,N'-dialkylalkylene diamine is reacted with an α-chlorodiphenyl acetyl chloride and subsequently with a lower alkanol, and the resulting product is hydrogenated to yield the α-alkoxy-N-alkyl-N-(alkylaminoalkyl)-diphenylacetamide employed in the preparation of the final product.

It is well recognized that in the case of such compounds having asymmetric structures, resolutions to the d- and l-isomers may provide additional pharmaceutically active products. The compounds of this invention are useful as analgesics. They can be administered either perorally or intramuscularly in the same manner as meperidine hydrochloride for the alleviation of pain.

The following examples illustrate the invention (all temperatures given are in degrees Centigrade):

EXAMPLE 1

*2-Ethoxy-N- {2 - [(β-Hydroxyphenethyl)Methyl-Amino]-Ethyl}-N-Methyl-2,2-Diphenylacetamide, Hydrochloride*

(a) PREPARATION OF N-BENZYL-N,N'-DIMETHYL-ETHYLENEDIAMINE

To a cooled solution of 500 g. of 40% aqueous monomethylamine is added 258 g. of 2-(N-benzyl-N-methylamino)ethyl chloride hydrochloride. The mixture is stirred for one hour at room temperature, then heated at 80–90° for three hours, cooled and treated portionwise with 200 g. of sodium hydroxide. The mixture is extracted three times with 600 ml. portions of ether and the combined ether extracts dried over potassium carbonate. After evaporation of the solvent, the residue is distilled to give 137 g. of N-benzyl-N,N-dimethylethylenediamine, having a boiling point of about 80–82° (0.5 mm.).

(b) PREPARTION OF N-[2-(N'-BENZYL - N' - METHYL-AMINO)ETHYL]-2-ETHOXY-N-METHYL-2,2-DIPHENYL-ACETAMIDE, HYDROCHLORIDE

A solution of 175 g. of amine from part (a) and 500 ml. of chloroform is added dropwise to a solution of 261 g. of α-chlorodiphenylacetyl chloride in 1000 ml. of chloroform while the temperature is maintained at 20–25°. The mixture is refluxed for one hour and then treated dropwise with 500 ml. of absolute alcohol while distilling 1400 ml. of solvent. The residue is treated with 1,500 ml. of absolute alcohol and then refluxed for eight hours. The bulk of the solvent is distilled at atmospheric pressure and the remainder (500 ml.) is removed under reduced pressure. The residue, upon dilution with 1,500 ml. of ether, gives about 427 g. of N-[2-(benzylmethylamino)ethyl]-2-ethoxy-N-methyl - 2,2-diphenylacetamide, hydrochloride, having a melting point of about 159–160°. Upon recrystallization from a mixture of acetonitrile ether, the purified product melts at about 162–164°.

(c) PREPARATION OF 2-ETHOXY-N-METHYL-N-(2-METH-YLAMINOETHYL)-2,2-DIPHENYLACETAMIDE, HYDRO-CHLORIDE

A warm solution of 35.0 g. of N-[2-(benzylmethylamino) - ethyl] - 2-ethoxy-N-methyl - 2,2 - diphenylacetamide, hydrochloride from part (b) is treated with a suspension of 3 g. of 5% palladium on carbon and placed in a Parr apparatus at 55# of hydrogen. Hydrogenation is complete in about thirty minutes. The product crystallizes from solution. The mixture is heated and diluted with 200 ml. of absolute alcohol to dissolve the product, filtered and the cooled filtrate is diluted with about 300 ml. of ether to give a crystalline solid weighing about 28.1 g.; M.P. about 200–201°. Recrystallization from 230 ml. of absolute alcohol yields about 24.7 g. of 2-ethoxy-N-methyl-N-(2-methylaminoethyl)-2,2-diphenylacetamide hydrochloride having a melting point of about 202–203°.

(d) PREPARATION OF 2-ETHOXY-N-METHYL-N-(2-METHYLAMINOETHYL)-2,2-DIPHENYLACETAMIDE

A suspension of 25.0 g. of 2-ethoxy-N-methyl-N-(2-methylaminoethyl)-2,2-diphenylacetamide, hydrochloride, from part (c) and 200 ml. of water is treated with a solution of 3.0 g. of sodium hydroxide in 30 ml. of water. The liberated base is extracted with ether and dried over magnesium sulfate. Evaporation of solvent yields about 19.5 g. of 2-ethoxy-N-methyl-N-(2-methylaminoethyl)-2,2-diphenylacetamide, having an M.P. of about 45–48°.

(e) PREPARATION OF 2-ETHOXY-N-METHYL-N-(2-METHYLPHENACYLAMINO)ETHYL - 2,2 - DIPHENYLACETAMIDE, HYDROCHLORIDE

A mixture of 12.0 g. of 2-ethoxy-N-methyl-N-(2-methylaminoethyl)-2,2-diphenylacetamide, from part (d) and 5.7 g. of phenacyl chloride in 250 ml. of xylene is refluxed for fifteen minutes and cooled. The resultant solid material is then filtered and the filtrate treated with 4 ml. of 5 N alcoholic hydrogen chloride to give 8.2 g. of the product, M.P. 175–180°. This material is then suspended in 80 ml. of water and then filtered and dried to give 7.0 g. of 2-ethoxy-N-methyl-N-[2-(methylphenacylamino)ethyl]-2,2-diphenylacetamide, hydrochloride, having a melting point of about 187–188°.

(f) PREPARATION OF 2-ETHOXY-N-{2-[($\beta$-HYDROXYPHENETHYL)METHYLAMINO]ETHYL}-N-METHYL - 2,2-DIPHENYLACETAMIDE, HYDROCHLORIDE A suspension of 4.1 g. of 2-ethoxy-N-methyl-N-[2-(methylphenacylamino)ethyl] - 2,2 - diphenylacetamide, hydrochloride from part (e) in 20 ml. of 50% ethanol is treated with a solution of 0.4 g. of sodium hydroxide in 30 ml. of 95% alcohol. 0.4 g. of sodium borohydride is then added and the mixture is slowly stirred for ten minutes. The stirred mixture is then extracted three times with 100 ml. portions of ether, and the combined extracts are dried over magnesium sulfate. The solution is then filtered and the filtrate is treated with 2 ml. of alcoholic hydrogen chloride to give about 3.5 g. of 2-ethoxy-N - {2[($\beta$ - hydroxyphenethyl)methylamino]ethyl}-N-methyl-2,2-diphenylacetamide, hydrochloride, having a melting point of about 162 to 164°.

EXAMPLE 2

2-Ethoxy - N - {2-[($\beta$-Hydroxyphenethyl)Methylamino]Ethyl} - N-Methyl-2,2-Diphenylacetamide, Hydrochloride A mixture of 5.5 g. of 2-ethoxy-N-methyl-N-(2-methylaminoethyl)-2,2-diphenylacetamide from Example 1, part (d) and 2.0 g. of styrene oxide is heated at 150 to 160° for four hours. After cooling, the mixture is dissolved in 10 ml. of absolute alcohol and the solution is then treated with 2.8 ml. of 6 N alcoholic hydrogen chloride. The resultant solution is diluted to 200 ml. with ether to give 7.0 g. of colorless product, melting point about 159–161°.

Recrystallization from 60 ml. of acetonitrile yields about 5.9 g. of 2-ethoxy-N-{2-[($\beta$-hydroxyphenethyl)methylamino]ethyl}-N-methyl-2,2-diphenylacetamide, hydrochloride, melting point about 162–164°.

EXAMPLE 3

2-Ethoxy-N-{2-[($\beta$-Hydroxy-4-Chlorophenethyl) - Methylamino]Ethyl}-N-Methyl-2,2-Diphenylacetamide, Hydrochloride A mixture of 2-ethoxy-N-methyl-N-(2-methylaminoethyl)-2,2-diphenylacetamide obtained from Example 1, part (d) and p-chlorostyrene oxide is treated in accordance with Example 2, yielding 2-ethoxy-{2-[($\beta$-hydroxy-4-chlorophenethyl)-methylamino]ethyl}-N-methyl - 2,2-diphenylacetamide, hydrochloride.

Similarly, m-methoxy styrene oxide is substituted for the p-chlorostyrene oxide above, and there is obtained 2 - ethoxy-N-{2-[($\beta$-hydroxy-3-methoxyphenethyl)-methylamino]ethyl}-N-methyl-2,2-diphenylacetamide, hydrochloride, the substitution of p-nitrostyrene oxide yields 2-ethoxy-N 2-[($\beta$-hydroxy-4-nitrophenethyl)-methylamino]ethyl-N-methyl - 2,2 - diphenylacetamide, hydrochloride, and the substitution of a bromostyrene oxide for the p-chlorostyrene oxide above yields 2-ethoxy-N-{2-[($\beta$-hydroxy-2-bromophenethyl) - methylamino]ethyl}-N-methyl-2,2-diphenylacetamide, hydrochloride.

EXAMPLE 4

N-{2 - [(p - Amino-$\beta$-Hydroxyphenethyl)Methylamino]-Ethyl}-2-Ethoxy-N-Methyl-2,2-Diphenylacetamide, Didrochloride A solution of 25 g. of 2-ethoxy-N-{2-[($\beta$-hydroxy-4-nitrophenylethyl)methylamino]ethyl} - N - methyl-2,2-diphenylacetamide, hydrochloride from Example 3 is dissolved in 200 ml. of absolute alcohol and treated with a suspension of 3 g. of 5% palladium carbon in 50 ml. of absolute alcohol. The mixture is placed in a hydrogenation apparatus under 58 lbs. of hydrogen at room temperature. Consumption of hydrogen is complete in fifteen minutes. The mixture is filtered and the filtrate treated with 7.5 ml. of 6 N alcoholic hydrogen chloride and the resulting solution diluted to 800 ml. with ether. After standing overnight in the cold, the solvent is decanted from the semi-solid product and the latter suspended in 250 ml. of chloroform. The addition of 150 ml. of methanol gives a solution which is treated with charcoal and filtered. The filtrate is diluted with 400 ml. of ether to give a crystalline product weighing about 20.6 g., melting point about 127–129°. 16 g. of this material is suspended in 50 ml. of methanol at room temperature, filtered and washed with methanol and then ether to give about 11.9 g. of N-{2-[(p-amino-$\beta$-hydroxyphenethyl) methylamino]ethyl}-2-ethoxy-N-methyl - 2,2 - diphenylacetamide, dihydrochloride, having a melting point of about 130-132°.

EXAMPLE 5

2-Ethoxy - N - {2-[($\beta$-Acetoxyphenethyl)Methylamino] Ethyl}-N-Methyl-2,2-Diphenylacetamide, Hydrochloride A mixture of 5.0 g. of 2-ethoxy-N-{2-[($\beta$-hydroxyphenethyl)-methylamino]ethyl}-N-methyl-2,2-diphenyl - acetamide, hydrochloride, obtained from Example 2, 30 ml. of acetic anhydride and 10 ml. of pyridine is refluxed for thirty minutes. After cooling, the mixture is diluted to 300 ml. with anhydrous ether to yield crystalline 2-ethoxy - N - {2-[($\beta$-acetoxyphenethyl)methylamino]ethyl}-N-methyl-2,2-diphenylacetamide, hydrochloride.

EXAMPLE 6

2-Ethoxy-N-{2-[($\beta$ - Propionyloxyphenethyl)Methylamino]Ethyl} - N - Methyl-2,2-Diphenylacetamide, Hydrochloride A mixture of 4.8 g. of 2-ethoxy-N-{-2-[($\beta$-hydroxyphenethyl) - methylamino]ethyl}-N-methyl-2,2-diphenylacetamide, hydrochloride from Example 2 in 100 ml. of chloroform was treated with 1.0 g. of propionyl chloride. The mixture was then refluxed for thirty minutes, cooled and diluted with 200 ml. of ether to give 4.5 g. of 2 - ethoxy-N-{2-[($\beta$ - propionyloxyphenethyl)methylamino]ethyl}-N-methyl - 2,2 - diphenylacetamide, hydrochloride.

EXAMPLE 7

2-Ethoxy - N - Methyl-N[2-($\alpha$-Hydroxy-$\alpha$-Phenylpropylamino)Ethyl]-2,2-Diphenylacetamide, Hydrochloride A mixture of 2-ethoxy-N-methyl-N-(2-methylaminoethyl)-2,2-diphenylacetamide obtained from Example 1, part (d) and 3-chloro propiophenone is treated according to Example 1, part (e). The resultant product is then reacted according to Example 1, part (f), yielding 2-ethoxy - N - methyl-N[2-($\alpha$-hydroxy-$\alpha$-phenylpropylamino)-ethyl]-2,2-diphenylacetamide, hydrochloride.

EXAMPLE 8

*2-Ethoxy-N-{2-[(2-Hydroxy - 3 - Phenoxypropyl)Methylamino]-Ethyl} - N - Methyl - 2,2 - Diphenylacetamide, Hydrochloride*

A mixture of 8.0 g. of 2-ethoxy-N-methyl-N-(2-methylaminoethyl) - 2,2 - diphenylacetamide obtained from Example 1, part (d) and 4.0 g. of 1,2-epoxy-3-phenoxypropane is heated for four hours at 150–160°. The product is dissolved in 15 ml. of ethanol and treated with 4 ml. of 6 N absolute hydrogen chloride and the resulting solution diluted to 450 ml. of ether. After standing in the cold, the mother liquor is decanted from the oil. After removal of the remainder of the solvent at reduced pressure, the oil becomes solid weighing 6.5 g. The latter is dissolved in 60 ml. of benzene, treated with charcoal and filtered. Removal of the solvent under reduced pressure gives a colorless foam-like solid. The latter is suspended in 100 ml. of hexane and filtered to give about 6.0 g. of 2-ethoxy-N-{2-[(2-hydroxy-3-phenoxypropyl)methylamino]-ethyl}-N-methyl-2,2 - diphenylacetamide, hydrochloride.

EXAMPLE 9

*2-Ethoxy-N-{2[(2 - Hydroxy - 3 - Ethoxypropyl)Methlamino]-Ethyl}-N-Methyl - 2,2 - Diphenylacetamide, Hydrochloride*

A mixture of 2-ethoxy-N-methyl-N-(2 - methylaminoethyl)-2,2-diphenylacetamide obtained from Example 1, part (d) and 1,2-epoxy-3-ethoxy propane is treated in accordance with Example 8 yielding 2-ethoxy-N-{2-[(2-hydroxy-3-ethoxypropyl)methylamino]-ethyl}-N - methyl-2,2-diphenylacetamide, hydrochloride.

Similarly, 1,2-epoxy - 3 - allyloxypyropane is substituted for 1,2-epoxy-3-ethoxypropane above, and there is obtained 2-ethoxy-N-{2-[(2-hydroxy-3-allyloxyproyl)methylamino]-ethyl}-N-methyl-2,2-diphenylacetamide, hydrochloride.

EXAMPLE 10

*2-Ethoxy-N-{2 - [(β - Hydroxyphenethyl)Methylamino]-ethyl}-N-Methyl - 2,2 - Bis(o-Chlorophenyl)Acetamide, Hydrochloride*

A solution of 175 g. of amine from Example 1, part (a) is treated in accordance with Example 1, part (b) except that 159 g. of 2-chloro-2,2-bis(o-chlorophenyl)-2-acetyl chloride is substituted for the α-chlorodiphenylacetyl chloride. The resultant material is further treated in accordance with the procedures of Example 1, part (c), (d), (e) and (f), yielding 2-ethoxy-N-{2-[(β-hydroxy-phenethyl)methylamino]ethyl}-N-methyl-2,2 - bis-(o-chlorophenyl)-acetamide, hydrochloride.

EXAMPLE 11

*2-Ethoxy-N-{2-[(β-Hydroxy-2-Furylethyl)Methylamino]-Ethyl}-N-Methyl-2,2-Diphenylacetamide, Hydrochloride*

2-Ethoxy-N-methyl-N-(2-methylaminoethyl) - 2,2 - diphenylacetamide from Example 1, part (d) is treated according to the procedure set forth in Example 2, except that 1,2-epoxyethyl-2-furane is substituted for the styrene oxide employed therein. 2-Ethoxy-N-{2-[(β - hydroxy-2-furylethyl)methylamino]ethyl}-N-methyl - 2,2 - diphenylacetamide, hydrochloride is obtained.

EXAMPLE 12

*(a) 2-Ethoxy-N-{2[(β-Acetoxyphenethyl)Methylamino]-Ethyl}-N-Methyl-2,2-Diphenylacetamide*

The 2-ethoxy-N-{2 - [(β - acetoxyphenethyl)methylamino]ethyl}-N-methyl-2,2-diphenylacetamide hydrochloride obtained in Example 5 is treated in accordance with the procedures set forth in Example 1, part (d) to obtain the free base 2-ethoxy-N-{2-[(β-acetoxyphenethyl)methylamino]ethyl}-N-methyl-2,2-diphenylacetamide.

*(b) 2 - Ethoxy-N - {2 - [(β - Acetoxyphenethyl)Methylamino]Ethyl}-N-Methyl-2,2-Diphenylacetamide, Phosphate*

The free base obtained in part (a) above is then treated with phosphoric acid to yield 2-ethoxy-N-{2-[(β-acetoxyphenethyl)methylamino]ethyl}-N-methyl - 2,2-diphenylacetamide, phosphate.

Similarly, the sulfate salt may be formed by treating the free base with sulfuric acid.

Likewise, the organic acid addition salts may be obtained by the treatment of the free base obtained in part (a) above, with an acid such as citric, tartaric and the like.

This invention may be variously otherwise embodied within the scope of the appended claims.

What is claimed is:

1. A compound selected from the class consisting of compounds of the following formula:

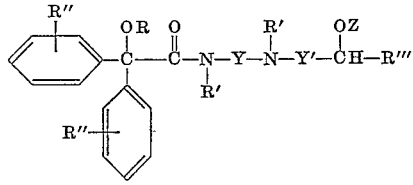

wherein R is lower alkyl; R' is a member of the group consisting of lower alkyl and lower alkenyl; R" is a member selected from the group consisting of hydrogen, halogen, halomethyl, lower alkyl, lower alkoxy, hydroxy, nitro, amino, cyano, lower alkanoyloxy and phenyl; Y is lower alkylene; Y' is lower alkylene; Z is a member selected from the group consisting of hydrogen and lower alkanoyl; and R''' is a member selected from the group consisting of R"-substituted phenyl, thienyl, furyl, and pyridyl; and the pharmaceutically acceptable acid addition and quarternary salts thereof.

2. 2-ethoxy-N-{2-[(β-hydroxyphenethyl)methalamino]-ethyl}-N-methyl-2,2-diphenylacetamide.

3. A pharmaceutically acceptable acid addition salt of the compound of claim 2.

4. 2-ethoxy-N-{2-[(2-hydroxy-3 - phenoxypropyl)methylamino]-ethyl}-N-methyl-2,2-diphenylacetamide.

5. 2-ethoxy-N-{2-[(β-hydroxy-4-halo - phenethyl)methylamino]ethyl}-N-methyl-2,2-diphenylacetamide.

6. 2-ethoxy-N-{2-[(β - hydroxy - 4 - aminophenethyl)-methylamino]-ethyl}-N-methyl-2,2-diphenylacetamide.

7. 2-ethoxy-N-{2-[(β - hydroxy - 4 - alkoxyphenethyl)-methylamino]ethyl}-N-methyl-2,2-diphenylacetamide.

8. 2-ethoxy-N-{2-[(β-acetoxyphenethyl)methylamino]-ethyl}-N-methyl-2,2-diphenylacetamide.

9. 2-ethoxy-N-methyl-N-[2-(α-hydroxy - α - phenylpropylamino)ethyl]-2,2-diphenylacetamide.

10. 2-ethoxy-N-{2-[(2-hydroxy-3 - ethoxypropyl)methylamino]ethyl}-N-methyl-2,2-diphenylacetamide.

11. 2-ethoxy-N - {2 - [(β - hydroxyphenethyl)methylamino]ethyl}-N-methyl-2,2-bis(o-chlorophenyl)acetamide.

12. 2-ethoxy-N-{2-[(β-hydroxy - 2 - furylethyl)methylaminoethyl}-N-methyl-2,2-diphenylacetamide.

References Cited in the file of this patent
UNITED STATES PATENTS 2,994,700    Krapcho  ---------------- Aug. 1, 1961

UNITED STATES PATENT OFFICE
CERTIFICATE OF CORRECTION

Patent No. 3,143,555

August 4, 1964

John Krapcho

It is hereby certified that error appears in the above numbered patent requiring correction and that the said Letters Patent should read as corrected below.

Column 1, line 25, for "2-buentyl" read -- 2-butenyl --; line 37, for "acryl" read -- acyl --; column 4, lines 12 and 13, for "Didrochloride", in italics, read -- Dihydrochloride --, in italics; column 5, lines 25 and 26, for "Methlamino", in italics, read -- Methylamino --, in italics; line 36, for "(2-hydroxy-3-allyloxyproyl)" read -- (2-hydroxy-3-allyloxypropyl) --; column 6, line 44, for "methalamino" read -- methylamino --.

Signed and sealed this 3rd day of August 1965

(SEAL)
Attest:

ERNEST W. SWIDER
Attesting Officer

EDWARD J. BRENNER
Commissioner of Patents